United States Patent
Sakurai et al.

(10) Patent No.: US 10,875,581 B2
(45) Date of Patent: Dec. 29, 2020

(54) VEHICLE TRUNK LID

(71) Applicants: Nissan North America, Inc., Franklin, TN (US); Nissan Motor Co., Ltd., Yokohama (JP)

(72) Inventors: Satoshi Sakurai, Kanagawa (JP); Michael Kowaczyk, Waterford, MI (US)

(73) Assignees: Nissan North America, Inc., Franklin, TN (US); Nissan Motor Co., Ltd., Kanagawa (JP)

( * ) Notice: Subject to any disclaimer, the term of this patent is extended or adjusted under 35 U.S.C. 154(b) by 27 days.

(21) Appl. No.: 16/206,119

(22) Filed: Nov. 30, 2018

(65) Prior Publication Data
US 2020/0172170 A1   Jun. 4, 2020

(51) Int. Cl.
  *B62D 25/12*  (2006.01)
  *B62D 25/10*  (2006.01)
  *F16F 15/02*  (2006.01)
  *F16F 7/104*  (2006.01)

(52) U.S. Cl.
CPC ........... *B62D 25/12* (2013.01); *B62D 25/105* (2013.01); *F16F 7/104* (2013.01); *F16F 15/02* (2013.01); *F16F 2222/08* (2013.01); *F16F 2234/02* (2013.01)

(58) Field of Classification Search
CPC ....... B62D 25/12; B62D 25/105; F16F 15/02; F16F 7/104; F16F 2222/08; F16F 2234/02
USPC ..................................... 296/76, 146.5, 181.1
See application file for complete search history.

(56) References Cited

U.S. PATENT DOCUMENTS

| | | | |
|---|---|---|---|
| 10,046,624 B2 * | 8/2018 | Motohashi | ............... B60J 5/107 |
| 2003/0057623 A1 * | 3/2003 | Maeno | ..................... F16F 7/108 |
| | | | 267/292 |
| 2003/0071481 A1 | 4/2003 | Igarashi et al. | |
| 2003/0102688 A1 * | 6/2003 | Bingle | ..................... E05B 83/26 |
| | | | 296/76 |
| 2004/0142232 A1 * | 7/2004 | Risca | ................. B60H 1/00514 |
| | | | 429/100 |

(Continued)

FOREIGN PATENT DOCUMENTS

| KR | 20000004777 A | 1/2000 |
|---|---|---|
| KR | 20040045630 A | 6/2004 |

OTHER PUBLICATIONS

International Search Report and Written Opinion in PCT/US2019/22418 dated May 30, 2019.

*Primary Examiner* — Pinel E Romain
(74) *Attorney, Agent, or Firm* — Global IP Counselors, LLP

(57) ABSTRACT

A vehicle trunk lid assembly includes an inner trunk panel, an upper outer trunk panel and a lower outer trunk panel. The inner trunk panel has a generally horizontal portion and an upright portion. The upright portion extends downward from the horizontal portion with the trunk lid assembly in a closed orientation. The upper outer trunk panel has a main section that extends horizontally and a contoured section that extends downwardly from a rearward area of the main section. The main section is attached to the horizontal portion of the inner trunk panel. The lower outer trunk panel is attached to at least a lower section of the upright portion of the inner trunk panel, a lower edge of the upper outer trunk panel and a lower edge of the inner truck panel.

19 Claims, 6 Drawing Sheets

(56) References Cited

U.S. PATENT DOCUMENTS

2006/0158007 A1* 7/2006 Seksaria .............. B62D 25/105
296/193.11
2014/0041306 A1 2/2014 Iwano et al.

* cited by examiner

VEHICLE TRUNK LID

BACKGROUND

Field of the Invention

The present invention generally relates to a vehicle trunk lid. More specifically, the present invention relates to a vehicle trunk lid having an inner trunk panel, an upper outer trunk panel and a lower outer trunk panel that, when fully assembled, define a space between inner and outer panels that houses a vibration damper assembly.

Background Information

SUMMARY

One object of the present disclosure is to provide a trunk lid assembly with a single inner trunk panel contoured to define a basic shape of the trunk lid, with an upper outer panel and a lower inner panel attached to the inner trunk panel.

Another object of the present disclosure is provide a trunk lid with a hollow space between an inner trunk panel and a upper outer trunk panel that retains a vibration damper assembly.

In view of the state of the known technology, one aspect of the present disclosure is to provide a vehicle trunk lid assembly with an inner trunk panel, an upper outer trunk panel and a lower outer trunk panel. The inner trunk panel has a generally horizontal portion and an upright portion, the upright portion extending downward from the horizontal portion with the trunk lid assembly in a closed orientation. The upper outer trunk panel has a main section that extends horizontally and a contoured section that extends downwardly from a rearward area of the main section. The main section is attached to the horizontal portion of the inner trunk panel. The lower outer trunk panel is attached to at least a lower section of the upright portion of the inner trunk panel. A lower edge of the upper outer trunk panel and a lower edge of the inner truck panel are rigidly fixed to one another.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the art from this disclosure that the following descriptions of the embodiments are provided for illustration only and not for the purpose of limiting the invention as defined by the appended claims and their equivalents.

Figure 1:
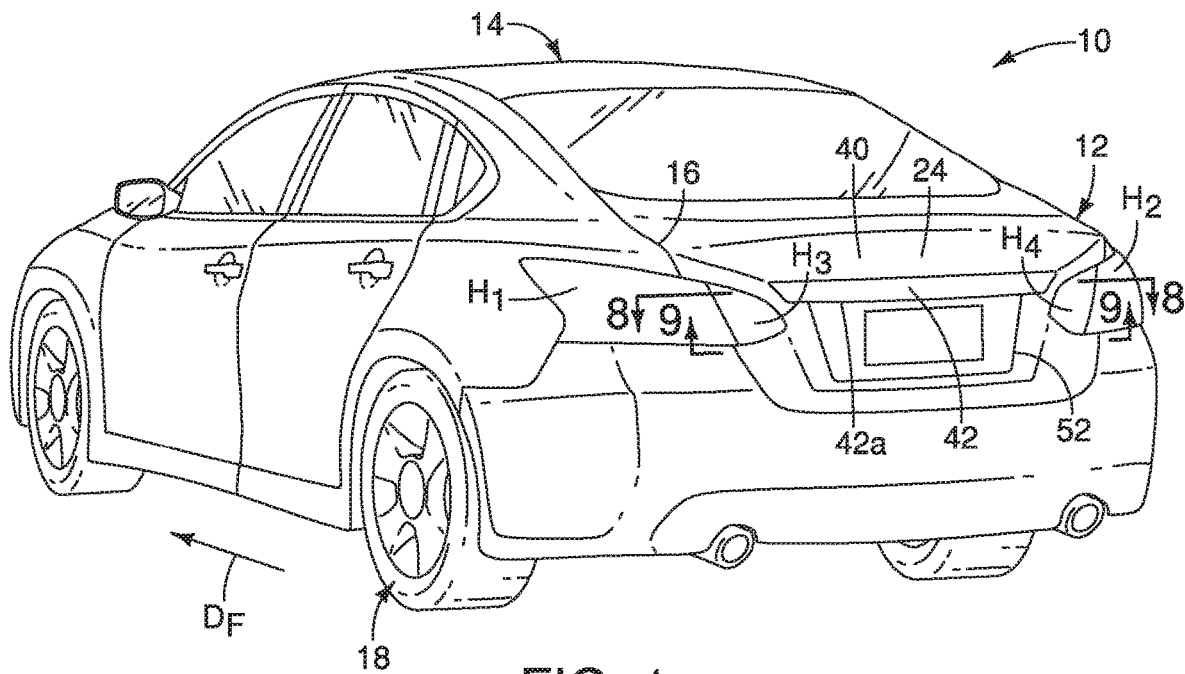
FIG. 1 is a rear perspective view of a vehicle showing a trunk area of the vehicle with a trunk lid assembly in a closed orientation concealing a trunk space within the trunk area of the vehicle in accordance with an exemplary embodiment.

Referring initially to FIG. 1, a vehicle 10 and a trunk lid assembly 12 is illustrated in accordance with a first embodiment.

The vehicle 10 includes a vehicle body structure 14 that defines a trunk opening 16 provided to access a trunk space (not shown) at the rear of the vehicle 10. Since trunk openings and trunk spaces defined by a vehicle body structure are conventional vehicle features well known in the art, further description of trunk openings and trunk spaces is omitted for the sake of brevity. The vehicle 10 also includes a vehicle suspension assembly 18 that includes conventional drive train components (not shown) and conventional suspension components (not shown). Since drive train components and suspension components features are well known in the art, further description is omitted for the sake of brevity.

Figure 2:
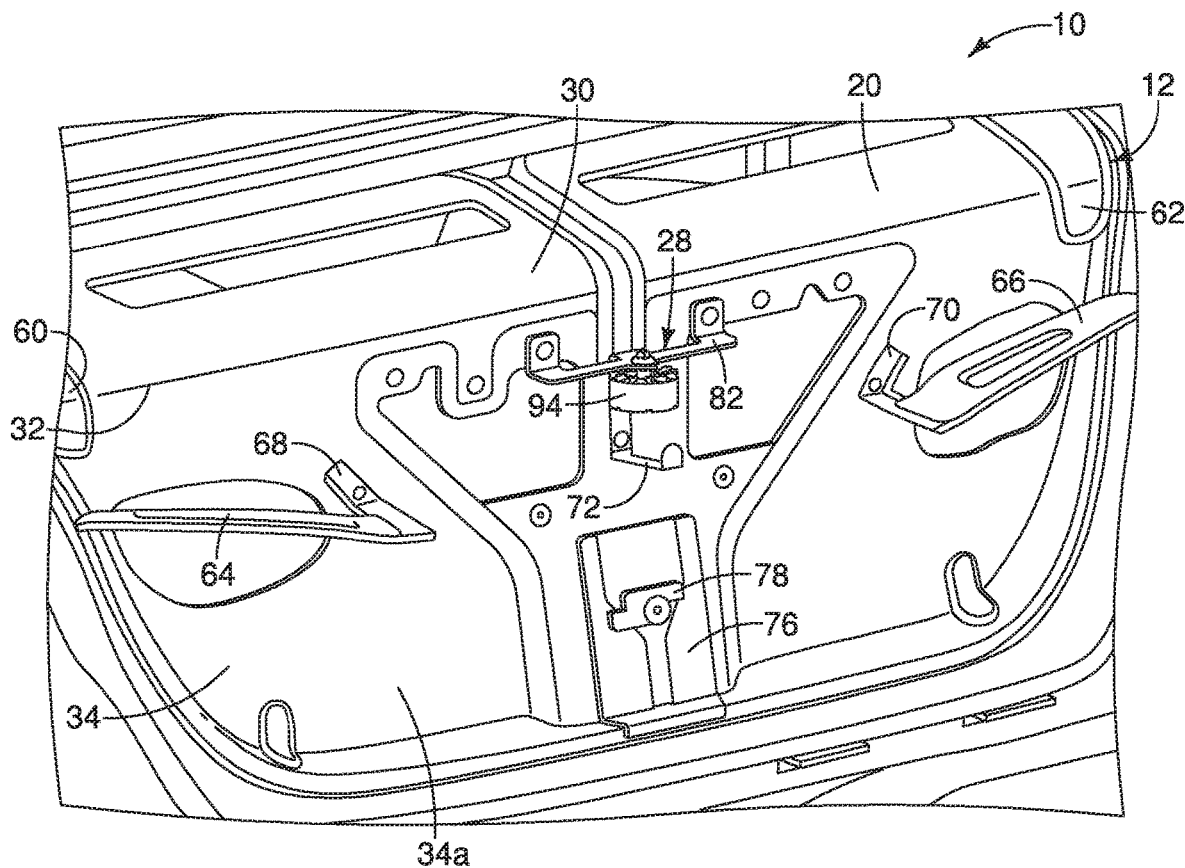
FIG. 2 is a rear perspective view of the trunk lid assembly removed from the vehicle and with an upper outer trunk panel and a lower outer trunk panel removed showing an inner trunk panel, a vibration damper assembly and a plurality of brackets that attach the upper outer trunk panel and the lower outer trunk panel to the inner trunk panel in accordance with the exemplary embodiment.
Figure 3:
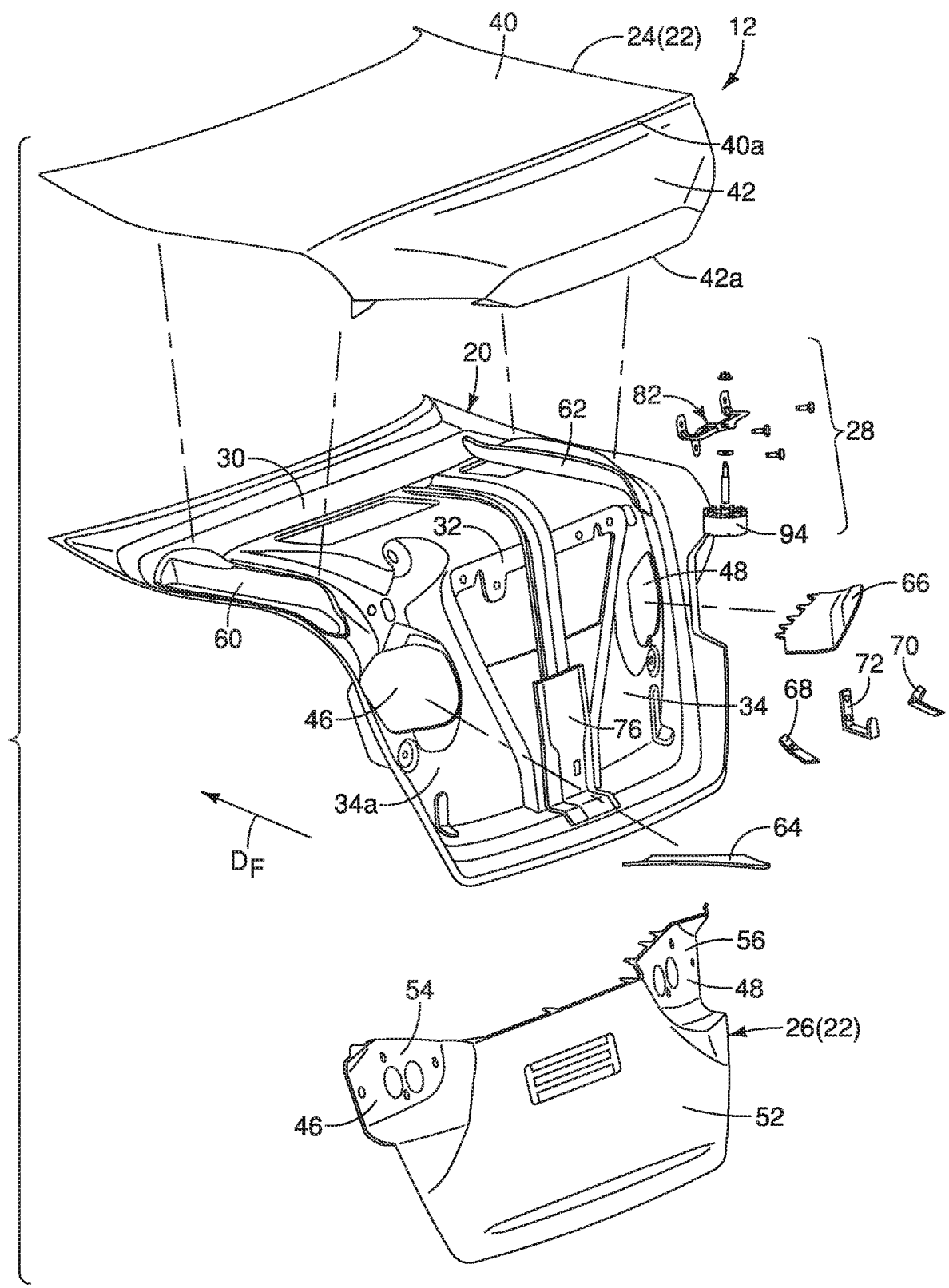
FIG. 3 is an exploded rear perspective view of the trunk lid assembly showing the upper outer trunk panel, the inner trunk panel, the lower outer trunk panel, the vibration damper assembly and a plurality of brackets that attach the upper outer trunk panel and the lower outer trunk panel to the inner trunk panel in accordance with the exemplary embodiment.

The trunk lid assembly 12 (also referred to herein as a vehicle trunk lid assembly) basically includes an inner trunk panel 20 (FIGS. 2, and 3), an outer lid panel assembly 22 as shown in FIGS. 1-3. The outer lid panel assembly 22 includes an upper outer trunk panel 24 and a lower outer trunk panel 26, with a vibration damper assembly 28 (FIGS. 2-5) installed within the trunk lid assembly 12 between the inner trunk panel 20 and the upper outer trunk panel 24, as described in greater detail below.

Figure 5:
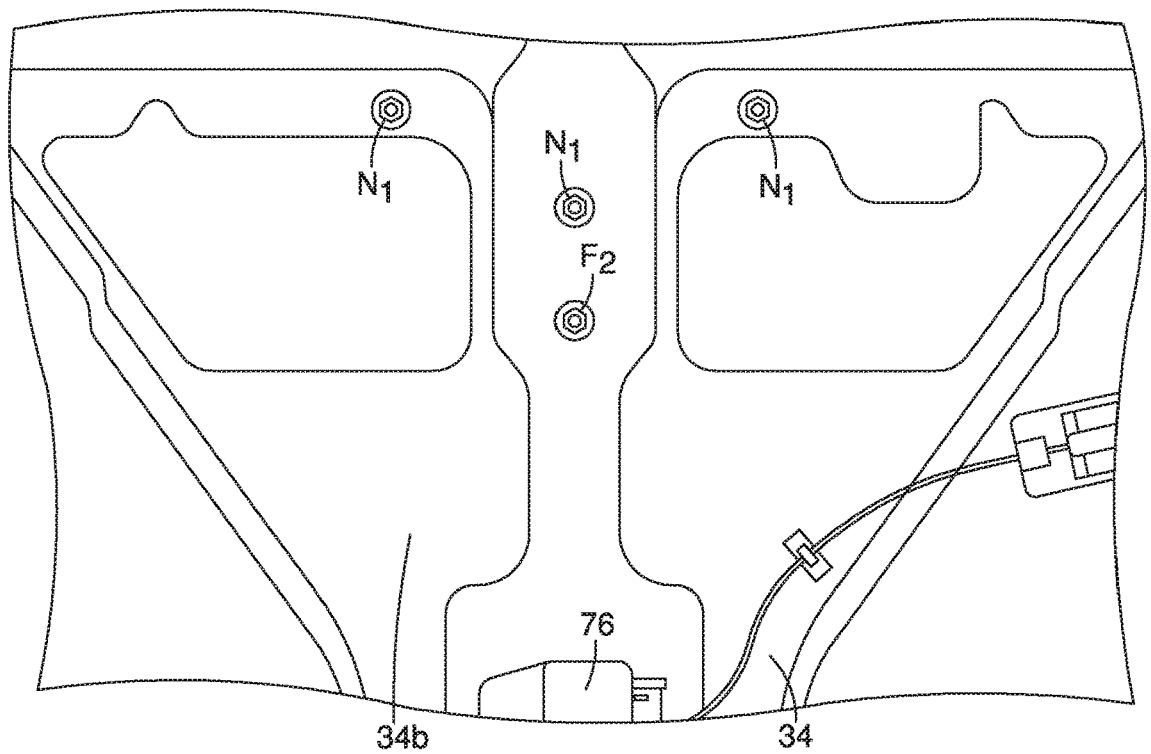
FIG. 5 is a plan view of a forward-facing surface of the inner trunk panel showing attachment fasteners that attach the vibration damper assembly to the inner trunk panel in accordance with the exemplary embodiment.

The outer lid panel assembly 22 is also referred to simply as an outer trunk panel 22. As shown in FIGS. 2 and 3, the inner trunk panel 20 is a single panel formed from sheet metal, or other suitable material, to define a contoured shape with a generally horizontal portion 30, a curved portion 32 and a generally upright portion 34. The curved portion 32 provides a transition from the horizontal portion 30 to the upright portion 34. The curved portion 32 extends from the horizontal portion 30 and curves downward to the upright portion 34 with the trunk lid assembly 12 in a closed orientation (shown in FIGS. 1-3). The upright portion 34 has a rearward facing surface 34a (FIGS. 2 and 3) and a forward-facing surface 34b (FIG. 5).

The upper outer trunk panel 24 (also referred to as a first outer trunk panel or a first portion) of the outer trunk panel assembly 22 has a main section 40 that extends in a generally horizontal direction and a contoured section 42 that curves and extends downwardly from a rearward end 40a of the main section 40.

A lower end 42a of the contoured section 42 of the upper outer trunk panel 22 includes a horizontal flange 44 that extends in a vehicle forward direction $D_F$ from the lower end to the inner trunk panel 20, as shown in FIGS. 6-9.

Lateral sides of the lower end 42a of the contoured section 42 of the upper outer trunk panel 24 and lateral sides of the lower outer trunk panel 26 define a pair of taillamp receiving pockets 46 and 48. The first taillamp receiving pocket 46 is defined at a first outboard side 44a of the horizontal flange 44. The second taillamp receiving pocket 48 is defined at a second outboard side 44b of the horizontal flange 44.

Figure 6:
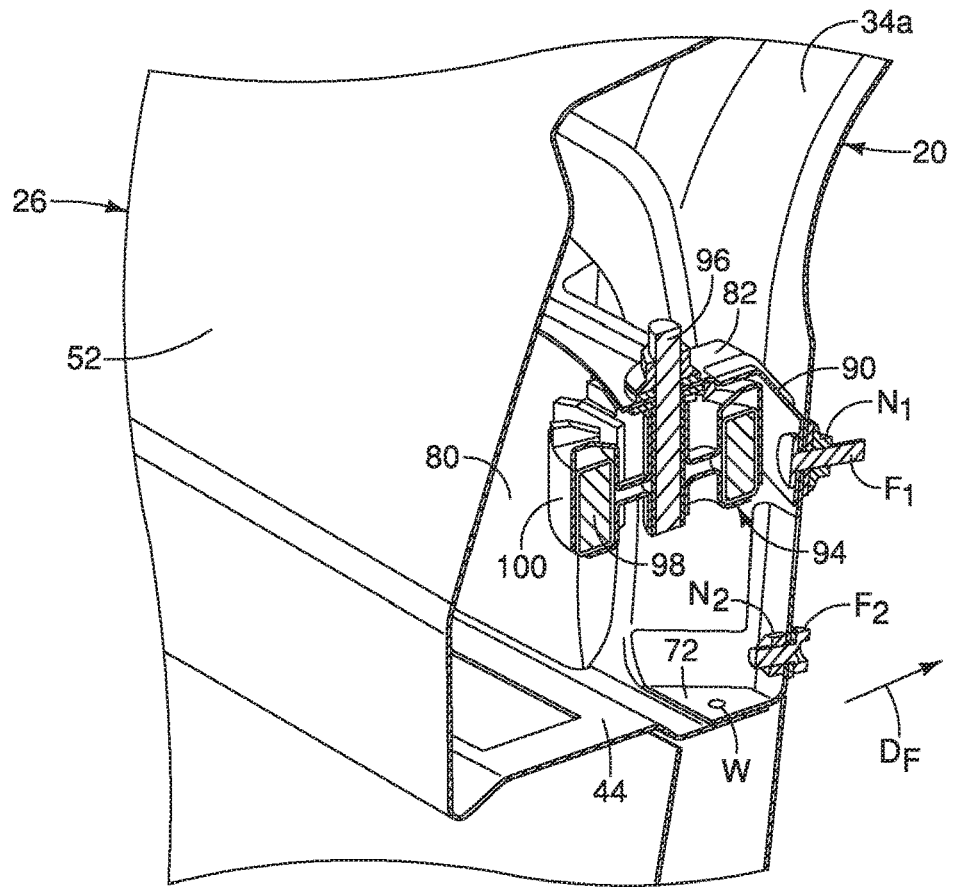
FIG. 6 is a cross-sectional view of a center area of the trunk lid assembly showing portions of the upper outer trunk panel, the inner trunk panel, the lower outer trunk panel, the vibration damper assembly and at least one of the plurality of brackets in accordance with the exemplary embodiment.

The lower outer trunk panel 26 is a contoured panel, preferably made of sheet metal or other suitable automotive panel forming material, that has a forward-facing surface 50 (FIG. 7), a rearward facing surface 52 (FIGS. 1, 3 and 6) and lateral side depressions 54 and 56. The forward-facing surface 50 is basically hidden with the trunk lid assembly 12 fully assembled. When assembled, the forward-facing surface 50 faces a rearward facing surface 34a of the upright portion 34 of the inner trunk panel 20. The rearward facing surface 52 is an exterior surface of the trunk lid assembly 12, as shown in FIGS. 1 and 6.

The lateral side depression 54 at least partially defines the first tail lamp receiving pocket 46. The lateral side depression 56 at least partially defines the second tail lamp receiving pocket 48.

The lower outer trunk panel 26 is attached to at least a lower section of the upright portion 34 of the inner trunk panel 20. For example, lower and outboard edges of the lower outer trunk panel 26 are fixedly attached to lower and outboard edges of the upright portion 34 of the inner trunk panel 20. This attachment can include fixing the lower and outboard edges of the lower outer trunk panel 26 to the lower and outboard edges of the upright portion 34 of the inner trunk panel 20 by means of a mastic, adhesive, mechanical fasteners or welding techniques.

The upper outer trunk panel 24, the lower outer trunk panel 26 and to the inner trunk panel 20 are further fixed to one another by upper brackets 60 and 62, outboard support brackets 64 and 66 (hereinafter referred to as reinforcement brackets or support brackets 64 and 66) and central brackets 68, 70 and 72. Specifically, the upper brackets 60 and 62 are welded or attached by mechanical fasteners (not shown) to the horizontal portion 30 of the inner trunk panel 20, as shown in FIGS. 1 and 2. The upper brackets 60 and 62 are also welded, attached by mechanical fasteners (not shown) or adhesively fixed to the main section 40 of the upper outer trunk panel 24.

Figure 8:
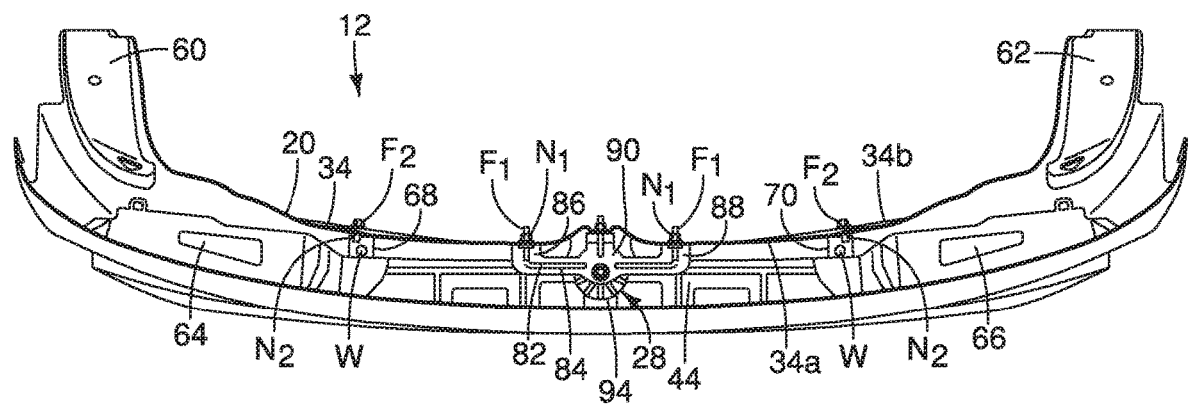
FIG. 8 is a cross-sectional view of the trunk lid assembly taken along the line 8-8 in FIG. 1, in accordance with the exemplary embodiment.
Figure 9:
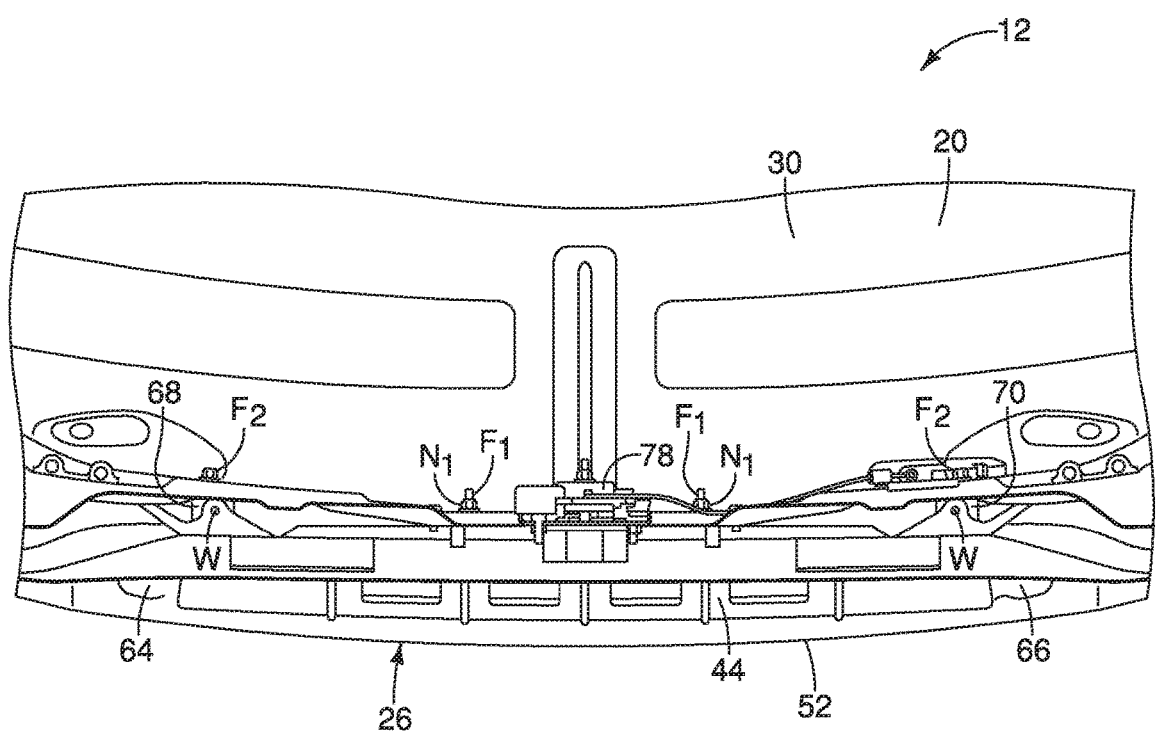
FIG. 9 is another cross-sectional view of the trunk lid assembly taken along the line 9-9 in FIG. 1, in accordance with the exemplary embodiment.

The support brackets 64 and 66 are located at opposite lateral sides of the upright portion 34 of the inner trunk panel 20 and extend generally horizontally (with a slight incline toward the center of the vehicle 10). The support brackets 64 and 66 are shown along the rearward facing surface 34a of the inner trunk panel 20 in FIG. 2. The support brackets 64 and 66 are preferably welded at weld points W to the central bracket 68 and 72 and to opposite lateral sides of the horizontal flange 44, as shown in FIGS. 8 and 9. As shown in FIG. 6, a central portion of the horizontal flange 44 is welded to the central bracket 72. The support brackets 64 and 66 can be fixed to the lower end 42a of the contoured section 42 of the upper outer trunk panel 24 at opposite lateral sides of the upper outer trunk panel 24.

The support brackets 64 and 66 provide reinforcement between lateral sides of the upright portion 34 of the inner trunk panel 20 and lateral sides of the lower outer trunk panel 26. The support brackets 64 and 66 also provide support to the structures surrounding the taillamp receiving pockets 46 and 48. As should be clear from the drawings and the description above, the horizontal flange 44 of the upper outer trunk panel 24 is located between the support panels 64 and 66 relative to a side-to-side direction of the vehicle 10, as shown in FIG. 8.

The central brackets 68, 70 and 72 are L-shaped metallic brackets that are each welded to the horizontal flange 44, as shown in FIGS. 6, 8 and 9, as described above. When the upper outer trunk panel 24 is installed to the inner trunk panel 20, there are at least three attachment points where mechanical fasteners are used. Specifically, the central brackets 68, 70 and 72 welded to the horizontal flange 44 of the upper outer trunk panel 24 are fixed to the inner trunk panel 20 via fasteners $F_2$ that are installed from the inner surface 34b of the horizontal portion 30 of the inner trunk panel 20 and threaded into nuts $N_2$ located on rearward sides of each of the central brackets 68, 70 and 72. The nuts $N_2$ can be welded to each of the central brackets 68, 70 and 72 or can be manually held in place when the fasteners $F_2$ are installed. The support brackets 64 and 66 are also welded to the central brackets 68 and 70.

Figure 7:
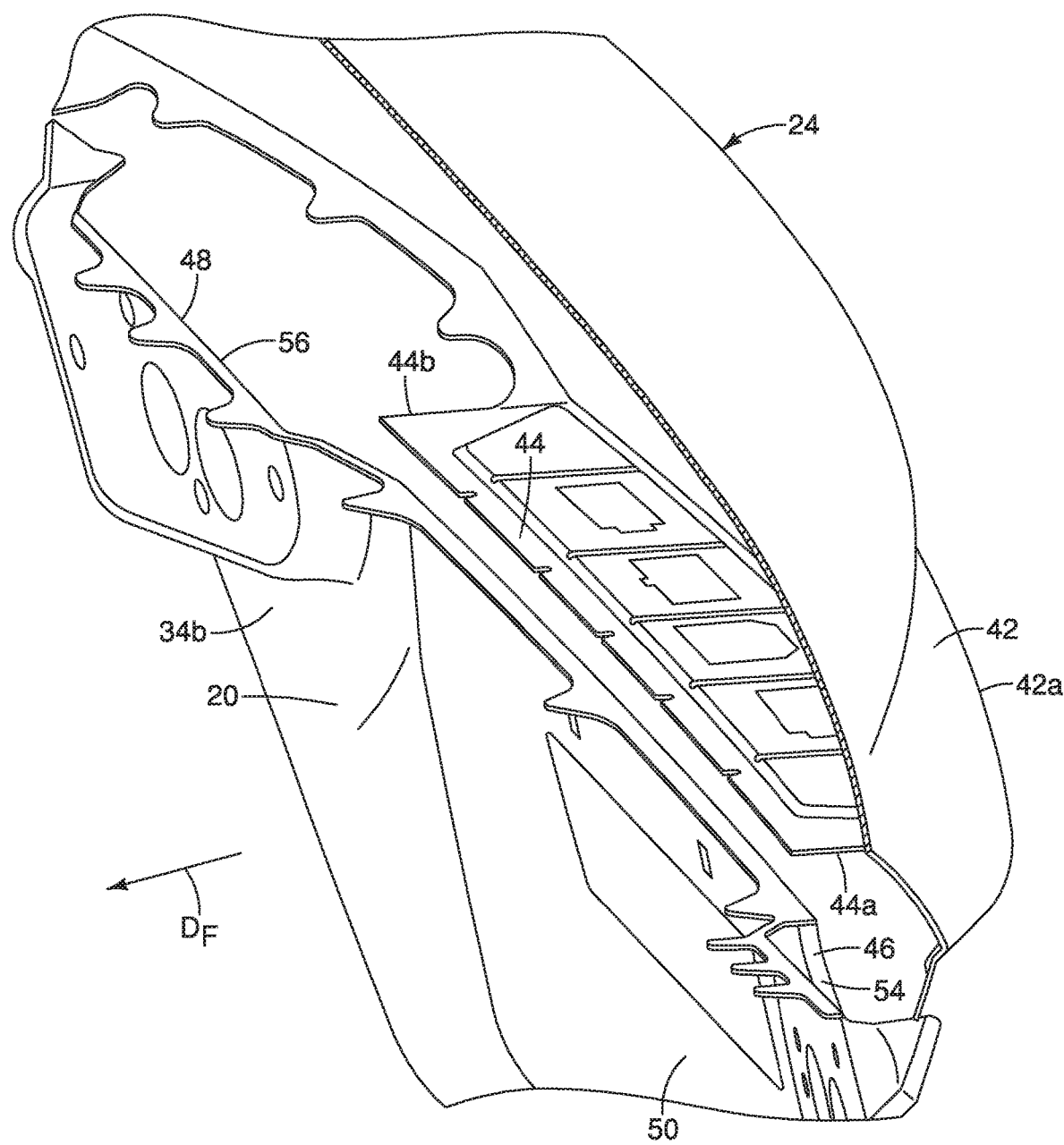
FIG. 7 is an exploded perspective of the upper outer trunk panel and the lower outer trunk panel, showing a horizontal flange of the upper outer trunk panel in accordance with the exemplary embodiment.

The lower outer trunk panel 26 attaches to the upper outer trunk panel 24 and the inner trunk panel 20 as follows. FIG. 7 shows the horizontal flange 44 of the upper outer trunk panel 24. Projections formed along the upper edge of the lower trunk panel 26 shown in FIG. 7 can be attached to the horizontal flange 44 and to the outboard support brackets 64 and 66 via a mastic, adhesive, mechanical fasteners or welding techniques. A license plate displaying area is defined below the horizontal flange 44 along a portion of the rearward facing surface of the lower outer trunk panel 24. Openings in the horizontal flange 44 are provided for installation of lamps (not shown) that illuminate the license plate displaying area, in a conventional manner.

Projections formed along the upper edge of the lower trunk panel 26 above each of the lateral side depressions 54 and 56 (shown in FIG. 7) are also fixed to respective ones of the outboard support brackets 64 and 66 via a mastic, adhesive, mechanical fasteners or welding techniques.

The first taillamp receiving pocket 46 is defined by the lateral side depression 54 and the outboard support bracket 64 (a first reinforcement bracket). The outboard support bracket 64 defines an upper wall of the first taillamp receiving pocket 46. Similarly, the second taillamp receiving pocket 48 is defined by the lateral side depression 56 and the outboard support bracket 66 (a second reinforcement bracket). The outboard support bracket 66 defines an upper wall of the second taillamp receiving pocket 48.

As shown in FIG. 1, taillamp structure $H_1$ and $H_2$ are installed to pockets (not shown) that are defined by the vehicle body structure 16 at opposite lateral sides of the trunk lid assembly 12 in a conventional manner. A taillamp structure $H_3$ is installed to the first taillamp receiving pocket 46 via fasteners (not shown). A taillamp structure $H_4$ is installed to the second taillamp receiving pocket 48 via fasteners (not shown).

Prior to installation of the upper outer trunk panel 24 and the lower outer trunk panel 24 to the inner trunk panel 20, a reinforcement bracket 76 is welded or fixed via mechanical fasteners to the rearward facing surface 34a of the inner trunk panel 20 along a central area of the upright portion 34, as shown in FIG. 3. A conventional latch mechanism 78 is installed to the reinforcement bracket 76 in a conventional manner. The reinforcement bracket 76 is an optional member that provides additional rigidity to the trunk lid assembly 12 in the area where the latch mechanism 78 is installed. Along with the reinforcement bracket 76, the vibration damper assembly 28 is also installed to the upright portion 34 of the inner trunk panel 20. Since latch mechanisms are conventional vehicle elements, further description is omitted for the sake of brevity.

A mastic and/or a sound dampening material can further be installed between the lower outer trunk panel 26 and the inner trunk panel 20.

When the upper and lower outer trunk panels 24 and 26 are attached to the inner trunk panel 20, a hollow area or hollow space 80 is defined between the inner trunk panel 20 and the contoured section 42 of the upper outer trunk panel 24, as shown in FIG. 6. The vibration damper assembly 28 is installed to the inner trunk panel 20 such that the vibration damper assembly 28 is located within the hollow space 80, as is also shown in FIG. 6.

Figure 4:
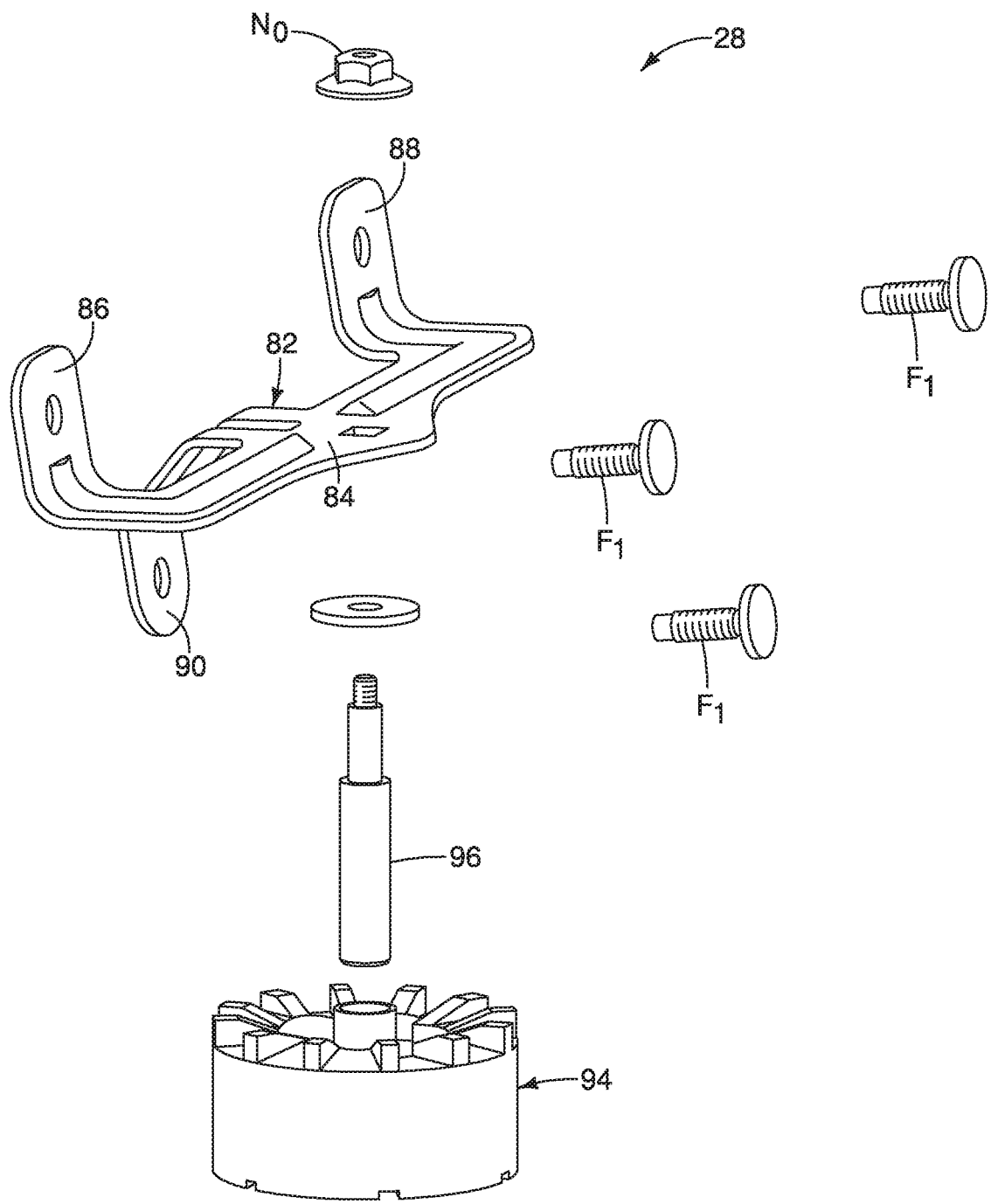
FIG. 4 is an exploded rear perspective view of the vibration damper assembly removed from the trunk lid assembly in accordance with the exemplary embodiment.

With specific reference to FIG. 4, a description is now provided for the vibration damper assembly 28. The vibration damper assembly 28 includes an attachment 82 that has a main portion 84, a first attachment flange 86 (driver's side), a second attachment flange 88 (passenger's side) and a third attachment flange 90 (centered). The main portion 84 is a generally horizontal part of the attachment bracket 82, with each of the first attachment flange 86, the second attachment flange 88 and the third attachment flange 90 extending perpendicular to the main portion 84. Specifically, the first attachment flange 86 and the second attachment flange 88 extend upward parallel to one another from the main portion 84. The third attachment flange 90 extends downward from the main portion 84. The first attachment flange 86, the second attachment flange 88 and the third attachment flange 90 are installed to an upper area of the rearward facing surface 34a of the upright portion of the inner trunk panel 20 and within the hollow space 80. Each of the first attachment flange 86, the second attachment flange 88 and the third attachment flange 90 has an opening that receives a corresponding one of fasteners $F_1$. As shown in FIG. 5, the fasteners $F_1$ thread into corresponding nuts $N_1$ that are welded or otherwise held against the forward-facing surface 34b of the inner trunk panel 20. As is also shown in FIG. 5, three fasteners $F_1$, and hence the first attachment flange 86, the second attachment flange 88 and the third attachment flange 90, define a triangle relative to one another.

The vibration damper assembly 28 further includes a damper device 94 that is attached to a central area of the main portion 84 of the attachment bracket 82. The vibration damper assembly 28 is attached to the inner trunk panel 20 at a location above the horizontal flange 44 of the upper outer trunk panel 24, as shown in FIG. 6. The damper device 94 includes an attachment member 96, an annular metallic weight 98 (FIG. 6) and an elastic housing 100 (FIG. 6) that completely surrounds and encapsulates the annular weight 98 and a lower portion of the attachment member 96. The attachment member 96 and the annular metallic weight 100 are co-axially aligned and spaced apart from one another with portions of the elastic housing 98 extending therebetween. An upper end of the attachment member 96 has machine threads mate with a nut $N_O$. The upper end of the attachment member 96 is inserted through a movement limiting washer and then through an opening in the main portion 84 of the attachment bracket 82, then threaded into the nut $N_O$ (a mechanical fastening element).

The elastic housing 98 is formed from a resilient, flexible material, including at least one of a resin material, a polymer material, or a rubber material.

The vibration damper assembly 28, and more specifically, the damper device 94, is attenuated to dampen vibrations that are produced by the vehicle 10 at predetermined vibration frequencies. For example, the vehicle suspension assembly 18 of the vehicle 10 may produce a certain resonant frequency of vibration. The damper device 94 can be attenuated to dampen those resonant vibrations.

The various elements and components of the vehicle 10, other than the trunk lid assembly 12, are conventional components that are well known in the art. Since vehicle elements and components are well known in the art, these structures will not be discussed or illustrated in detail herein. Rather, it will be apparent to those skilled in the art from this disclosure that the components can be any type of structure and/or programming that can be used to carry out the present invention.

General Interpretation of Terms

In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. Also as used herein to describe the above embodiment, the following directional terms "forward", "rearward", "above", "downward", "vertical", "horizontal", "below" and "transverse" as well as any other similar directional terms refer to those directions of a vehicle equipped with the trunk lid assembly. Accordingly, these terms, as utilized to describe the present invention should be interpreted relative to a vehicle equipped with the trunk lid assembly.

The terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. For example, the size, shape, location or orientation of the various components can be changed as needed and/or desired. Components that are shown directly connected or contacting each other can have intermediate structures disposed between them. The functions of one element can be performed by two, and vice versa. The structures and functions of one embodiment can be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature or features. Thus, the foregoing descriptions of the embodiments according to the present invention are provided for illustration only, and not for the purpose of limiting the invention as defined by the appended claims and their equivalents.

What is claimed is:

1. A vehicle trunk lid assembly, comprising:
an inner trunk panel having a generally horizontal portion and an upright portion, the upright portion extending downward from the horizontal portion with the trunk lid assembly in a closed orientation;
an upper outer trunk panel having a main section that extends horizontally and a contoured section that extends downwardly from a rearward area of the main section, the main section being attached to the horizontal portion of the inner trunk panel; and
an lower outer trunk panel being attached to a lower section of the upright portion of the inner trunk panel and a lower edge of the inner truck panel, the upper outer trunk panel and the lower outer trunk panel being separate members with the lower outer trunk panel being welded to a lower edge of the upper outer trunk panel.

2. The vehicle trunk lid assembly according to claim 1, wherein
a lower end of the contoured section of the upper outer trunk panel includes a horizontal flange that extends in a vehicle forward direction from the lower end to the inner trunk panel.

3. The vehicle trunk lid assembly according to claim 2, wherein
the lower end of the contoured section of the upper outer trunk panel and the lower outer trunk panel define a pair of taillamp receiving pockets, a first one of the taillamp receiving pockets being defined at a first outboard side of the horizontal flange and a second of the taillamp receiving pockets being defined at a second outboard side of the horizontal flange.

4. The vehicle trunk lid assembly according to claim 3, wherein
the first one of the taillamp receiving pockets is further defined by a first reinforcement bracket fixed to the lower end of the contoured section of the upper outer trunk panel and the upright portion of the inner trunk panel thereby defining an upper wall of the first one of the taillamp receiving pockets, and
the second one of the taillamp receiving pockets is further defined by a second reinforcement bracket fixed to the lower end of the contoured section of the upper outer trunk panel and the upright portion of the inner trunk panel thereby defining an upper wall of the second one of the taillamp receiving pockets.

5. The vehicle trunk lid assembly according to claim 1, wherein
the upper outer trunk panel and the upright portion of the inner trunk panel define a hollow space therebetween, with a vibration damper assembly attached to an upper area of the upright portion of the inner trunk panel within the hollow space, the vibration damper assembly being attenuated to dampen vibrations.

6. A vehicle trunk lid assembly, comprising:
an inner trunk panel having a horizontal portion and an upright portion;
an outer trunk panel attached to the inner trunk panel, with central areas of each of the inner trunk panel and the outer trunk panel defining a hollow space therebetween; and
a vibration damper assembly attached to an upper area of the upright portion of the inner trunk panel within the hollow space, the vibration damper assembly being attenuated to dampen vibrations, the vibration damper assembly including an attachment bracket having a main portion, a first attachment flange, a second attachment flange and a third attachment flange that extend from the main portion, the first attachment flange extending from a driver's side end of the main portion, the second attachment flange extending from a passenger's side end of the main portion, and the third attachment flange extending from a central area of the main portion.

7. The vehicle trunk lid assembly according to claim 6, wherein
each of the first, second and third attachment flanges having a corresponding fastener opening such that fastener openings of the three attachment flanges define a triangle relative to one another.

8. The vehicle trunk lid assembly according to claim 6, wherein
the vibration damper assembly further includes a damper device attached to the central area of the main portion of the attachment bracket.

9. The vehicle trunk lid assembly according to claim 6, wherein
the outer trunk panel includes a first portion and a second portion, the first portion having a main section that extends horizontally and a contoured section that extends downwardly from a rearward end of the main section, the first portion and the second portion being fixed to one another and to the inner trunk panel.

10. The vehicle trunk lid assembly according to claim 8, wherein
the first portion of the outer trunk panel includes a horizontal flange that extends in a vehicle forward direction from a lower end of the first portion to the inner trunk panel.

11. The vehicle trunk lid assembly according to claim 9, further comprising
a pair of support brackets fixed to the horizontal portion of the inner panel and extending in a rearward direction relative to the inner trunk panel to the first portion of the outer trunk panel, such that the horizontal flange of the first portion of the outer trunk panel is located between the pair of support panels and is fixed thereto.

12. The vehicle trunk lid assembly according to claim 10, wherein
the vibration damper assembly is attached to the inner trunk panel at a location above the horizontal flange of the first portion of the outer trunk panel.

13. The vehicle trunk lid assembly according to claim 11, wherein
the vibration damper assembly includes an attachment bracket having a main portion, a first attachment flange, a second attachment flange and a third attachment flange that extend from the main portion, the first attachment flange extending from a driver's side end of the main portion, the second attachment flange extending from a passenger's side end of the main portion, and the third attachment flange extending from a central area of the main portion.

14. The vehicle trunk lid assembly according to claim 12, wherein
the vibration damper assembly further includes a damper device attached to the central area of the main portion of the attachment bracket, the damper device including an attachment member, an annular metallic weight and an elastic housing that completely surrounds and encapsulates the annular weight and a lower portion of the attachment member, with the attachment member and the annular metallic weight being co-axially aligned and spaced apart from one another with portions of the elastic housing extending therebetween, and the elastic housing is formed from a resilient, flexible material, including at least one of a resin material, a polymer material, or a rubber material, such that the elastic housing, the annular metallic and the attachment member are configured to absorb vibrations at predetermined vibration frequencies.

15. The vehicle trunk lid assembly according to claim 14, wherein the damper device includes an attachment member, an annular metallic weight and an elastic housing that completely surrounds and encapsulates the annular weight and a lower portion of the attachment member.

16. The vehicle trunk lid assembly according to claim 15, wherein the attachment member and the annular metallic weight are co-axially aligned and spaced apart from one another with portions of the elastic housing extending therebetween.

17. The vehicle trunk lid assembly according to claim 16, wherein the attachment member has an upper end configured to receive a mechanical fastening element that contacts the central area of the main portion of the attachment bracket.

18. The vehicle trunk lid assembly according to claim 16, wherein the elastic housing is formed from a resilient, flexible material, including at least one of a resin material, a polymer material, or a rubber material, and the elastic housing, the annular metallic and the attachment member are configured to absorb vibrations at predetermined vibration frequencies.

19. The vehicle trunk lid assembly according to claim 15, wherein the elastic housing, the annular metallic and the attachment member are configured to absorb vibrations at predetermined vibration frequencies.

* * * * *